United States Patent
Forthoffer

(10) Patent No.: US 11,738,812 B2
(45) Date of Patent: Aug. 29, 2023

(54) AUTOMATIC COUPLING SYSTEM

(71) Applicant: R.A. PHILLIPS INDUSTRIES, INC., Santa Fe Springs, CA (US)

(72) Inventor: Daniel William Forthoffer, Birmingham, MI (US)

(73) Assignee: R.A. PHILLIPS INDUSTRIES, INC., Santa Fe Springs, CA (US)

(*) Notice: Subject to any disclaimer, the term of this patent is extended or adjusted under 35 U.S.C. 154(b) by 220 days.

(21) Appl. No.: 17/374,699

(22) Filed: Jul. 13, 2021

(65) Prior Publication Data

US 2023/0015078 A1    Jan. 19, 2023

(51) Int. Cl.
*B62D 53/12* (2006.01)

(52) U.S. Cl.
CPC ............................ *B62D 53/125* (2013.01)

(58) Field of Classification Search
CPC ............................. B62D 53/125; B60D 1/64
See application file for complete search history.

(56) References Cited

U.S. PATENT DOCUMENTS

| | | | |
|---|---|---|---|
| 3,181,888 A | 5/1965 | Boylan et al. | |
| 3,719,372 A | 3/1973 | Rawlings | |
| 5,346,239 A * | 9/1994 | Wohlhuter | B62D 53/125 280/422 |
| 5,713,592 A | 2/1998 | Dunell | |
| 2009/0127823 A1 * | 5/2009 | Colibert-Clarke | B62D 53/0807 280/438.1 |
| 2015/0008658 A1 * | 1/2015 | Keatley | B62D 21/09 280/495 |
| 2020/0086703 A1 * | 3/2020 | Johnson | B60D 1/42 |
| 2021/0039459 A1 | 2/2021 | Koster | |
| 2021/0053407 A1 * | 2/2021 | Smith | B25J 9/1697 |
| 2021/0061376 A1 * | 3/2021 | Moore | B60D 1/64 |

FOREIGN PATENT DOCUMENTS

| | | |
|---|---|---|
| DE | 10 2018 120 470 A1 | 2/2020 |
| EP | 0 539 675 A1 | 5/1993 |
| WO | WO 2010/118420 A2 | 10/2010 |
| WO | WO-2019180017 A1 * | 9/2019 ........... B62D 53/125 |
| WO | WO-2020038986 A1 * | 2/2020 ............. B60D 1/015 |

OTHER PUBLICATIONS

KKK Sales Brochure RZ GB, Out of This World, Jost KKS push-button trailer coupling, kks-futurenow.com, 5 pages.
International Search Report and Written Opinion issued in corresponding PCT Application No. PCT/US2022/022652, dated Jun. 21, 2022, 13 pages.

* cited by examiner

*Primary Examiner* — Minnah L Seoh
*Assistant Examiner* — Ryan Edward Hardy
(74) *Attorney, Agent, or Firm* — Lewis Roca Rothgerber Christie LLP

(57) ABSTRACT

An auto-coupling system for coupling a trailer and a towing vehicle includes a base plate between a vehicle frame and a fifth wheel of the towing vehicle, an extendable arm rotatably coupled to the base plate at a first point and configured to extend in response to relative movement of the towing vehicle and the trailer, a spring fixedly coupled to the base plate at a second point and coupled to the extendable arm, the spring being configured to exert a retractive force onto the extendable arm, and an alignment assembly rotatably coupled to the extendable arm and configured to move against an outer perimeter of the trailer.

18 Claims, 14 Drawing Sheets

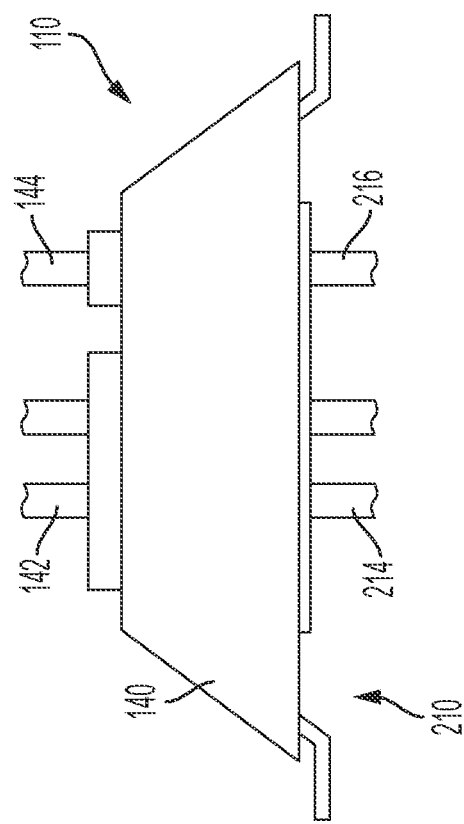
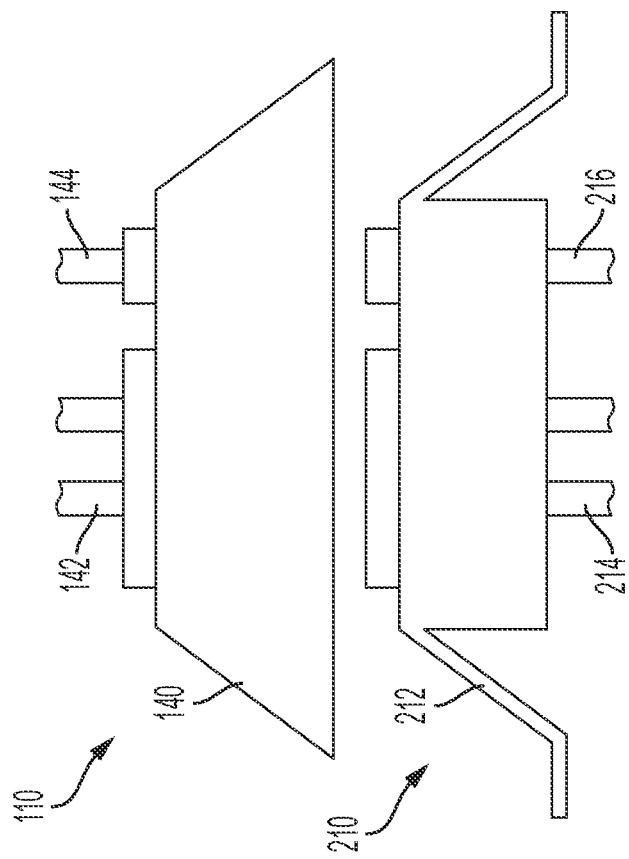
FIG. 2A
FIG. 2B

AUTOMATIC COUPLING SYSTEM

FIELD

The present invention relates to trailer coupling systems and methods of using the same.

BACKGROUND

Generally, in order for a motorized vehicle to tow a trailer, there is a connection methodology that allows the trailer to rotate to a certain extent both vertically and horizontally in relation to the motorized vehicle while towing the trailer through the use of a hitch, fifth wheel, or other apparatus. This hitch, fifth wheel, or other apparatus with similar functionality is used to connect and disconnect the trailer from the motorized vehicle as well as maintain the connection between the motorized vehicle to the trailer during most, if not all, of the circumstances encountered while the motorized vehicle is towing the trailer.

Commonly, the towing vehicle has a coupling plate known as a fifth wheel, which is bolted to its rear chassis or frame, on which the trailer rests and pivots. When the towing vehicle reverses under the trailer, a kingpin under and near the front side of the trailer slides into a slot in the fifth wheel and is locked in place as the clamps of the fifth wheel close onto it. This secures the trailer to the towing vehicle while allowing limited relative motion between the two.

In addition to establishing a physical connection between the towing vehicle and trailer, a number of connections are initiated and maintained between the two, which allow the electrical and mechanical systems within the trailer to operate while being towed. These connections may include electrical, pneumatic, and other connections. The electrical connections may operate and obtain feedback from lights, braking systems, electronic control systems, telematics systems, backup warning systems, lane keeping and departure systems, camera systems and the like. The pneumatic connections may operate and obtain feedback from braking systems, connector blow-off systems, tire pressure maintenance systems, cooling systems and others. Other types of connections that may exist between the towing vehicle and trailer may include, for example, hydraulic connections, rotational (PTO) connections, and/or the like.

Once the trailer is physically coupled to the towing vehicle via a hitch, the fifth wheel, or other apparatus, the driver then couples the airbrake lines and electrical cables. The need for human intervention for coupling towing vehicles and trailers makes existing coupling solutions unsuitable for autonomous systems.

The above information disclosed in this Background section is only for enhancement of understanding of the background of the invention and therefore it may contain information that does not form the prior art that is already known to a person of ordinary skill in the art.

SUMMARY

Aspects of embodiments of the present invention are directed to an auto-coupling system for automatically aligning electrical, pneumatic, and other connections between a towing vehicle and a trailer without human intervention.

According to some embodiments of the invention, there is provided an auto-coupling system for coupling a trailer and a towing vehicle, the auto-coupling system including: a base plate between a vehicle frame and a fifth wheel of the towing vehicle; an extendable arm rotatably coupled to the base plate at a first point and configured to extend in response to relative movement of the towing vehicle and the trailer; a spring fixedly coupled to the base plate at a second point and coupled to the extendable arm, the spring being configured to exert a retractive force onto the extendable arm; and an alignment assembly rotatably coupled to the extendable arm and configured to move against an outer perimeter of the trailer.

In some embodiments, the first point is offset from the second point along a longitudinal direction of the towing vehicle, and wherein the first point extends past the fifth wheel of the towing vehicle in a plan view.

In some embodiments, the base plate has a plurality of openings corresponding in position to mounting holes of the fifth wheel.

In some embodiments, the auto-coupling system further includes a riser between the base plate and the vehicle frame and configured to offset a bottom surface of the base plate from a top of the vehicle frame.

In some embodiments, the trailer exerts an extensive force on the extendable arm via the alignment assembly as the alignment assembly is pressed against a perimeter of the trailer, wherein the extensive force counteracts the retractive force.

In some embodiments, the extendable arm is pivotally coupled to the base plate by a roller bearing.

In some embodiments, the extendable arm is configured to align the alignment assembly with a centerline of the trailer for an engagement angle of −45 degrees to 45 degrees.

In some embodiments, the extendable arm includes: a first extension member rotatably coupled to the base plate; and a second extension member configured to slide along a lengthwise direction of the extendable arm relative to the first extension member.

In some embodiments, one of the first and second extension members includes a guide rail, and wherein another one of the first and second extension members includes a carriage having one or more carriage rollers that are configured to fit within and glide against a track of the guide rail.

In some embodiments, the spring is fixedly coupled to the second extension member of the extendable arm at a third point.

In some embodiments, the alignment assembly is configured to freely roll along a front surface of the trailer and to come to rest at a point where the spring assumes a shortest length according to an angular orientation between the trailer and the towing vehicle.

In some embodiments, the alignment assembly includes: a support arm extending transverse to a lengthwise direction of the extendable arm and rotatably coupled to a contact arm of the extendable arm at a third point; a first wheel coupled to the support arm via a first frame; and a second wheel coupled to the support arm via a second frame, the second frame being at an angle with respect to the first frame.

In some embodiments, the first and second wheels are configured to move across a front surface of the trailer facing the towing vehicle.

In some embodiments, the auto-coupling system further includes: a first connector assembly coupled to the alignment assembly and configured to mate with a second connector assembly of the trailer in response to the towing vehicle performing a coupling maneuver with the trailer.

In some embodiments, the first connector assembly is connected to first electrical and pneumatic conduits from the towing vehicle, and the second connector assembly is connected to second electrical and pneumatic conduits to the trailer.

In some embodiments, the extendable arm, the spring, and the alignment assembly are together configured to align the first connector assembly with the second connector assembly.

In some embodiments, the extendable arm, the spring, and the alignment assembly are together configured to position the first connector assembly to within 1 cm to 5 cm of the second connector assembly.

In some embodiments, the extendable arm, the spring, and the alignment assembly are together configured to maintain alignment between the first and second connector assemblies through trailer-vehicle angles of −135 degrees to 135 degrees.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be illustrative only.

FIG. 2A illustrates a top view of first and second connector assemblies and while they are separated from one another in an unengaged state, according to some example embodiments of the present disclosure.

FIG. 2B illustrates a top view of the connector assemblies of a trailer and a towing vehicle in an engaged state, according to some example embodiments of the present disclosure.

DETAILED DESCRIPTION

The detailed description set forth below in connection with the appended drawings is intended as a description of illustrative embodiments of a an auto-coupling system in accordance with the present invention, and is not intended to represent the only forms in which the present invention may be implemented or utilized. The description sets forth the features of the present invention in connection with the illustrated embodiments. It is to be understood, however, that the same or equivalent functions and structures may be accomplished by different embodiments that are also intended to be encompassed within the spirit and scope of the present invention. As denoted elsewhere herein, like element numbers are intended to indicate like elements or features.

Aspects of embodiments of the present invention are directed to an auto-coupling system for automatic alignment of electrical, pneumatic, and other connections used to facilitate the coupling of a motorized vehicle to a trailer, without human intervention. As a towing vehicle backs into a trailer to engage and lock the kingpin of the trailer with the fifth wheel of the towing vehicle, an adjustable arm of the auto-coupling system automatically brings the connector assembly of the towing vehicle in close alignment with the corresponding connector assembly of the trailer to allow the two connector assemblies to make contact and couple the electrical, pneumatic, and other connections of the towing vehicle to those of the trailer. As such, the electrical and pneumatic connections may be established without human intervention. This makes the auto-coupling system particularly suitable to autonomous driving/hauling solutions that do not involve a human driver.

As used herein a towing vehicle refers to any implement incorporating a fifth wheel style trailer hitch that is capable of pulling another implement without its own ability to propel itself. Examples of towing vehicles include semi-tractors, terminal tractors, pickup trucks equipped with a fifth wheel hitch, autonomous vehicles equipped with a fifth wheel hitch, and the like. Further, a trailer refers to any implement (e.g., any unpowered implement) designed to be connected to a fifth wheel hitch assembly for the sole purpose of towing, and which includes a kingpin mounted to its underside. Examples of trailers include dry van trailers, flat bed trailers, tanker trailers, chassis trailers, camper trailers, some farm implements, and the like.

Figure 1A:
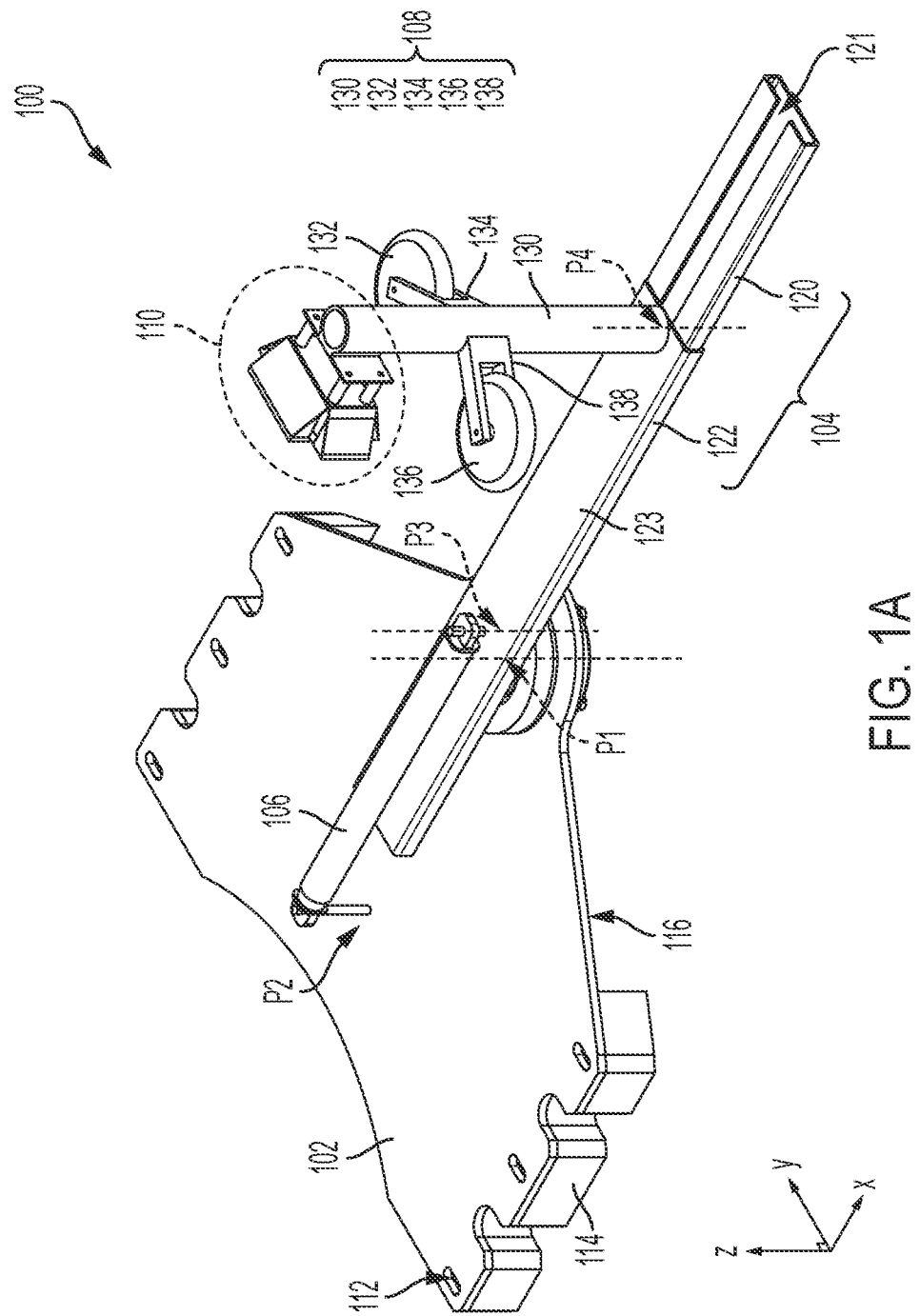
FIG. 1A illustrates a perspective view of the auto-coupling system at rest, according to some example embodiments of the present disclosure.
Figure 1B:
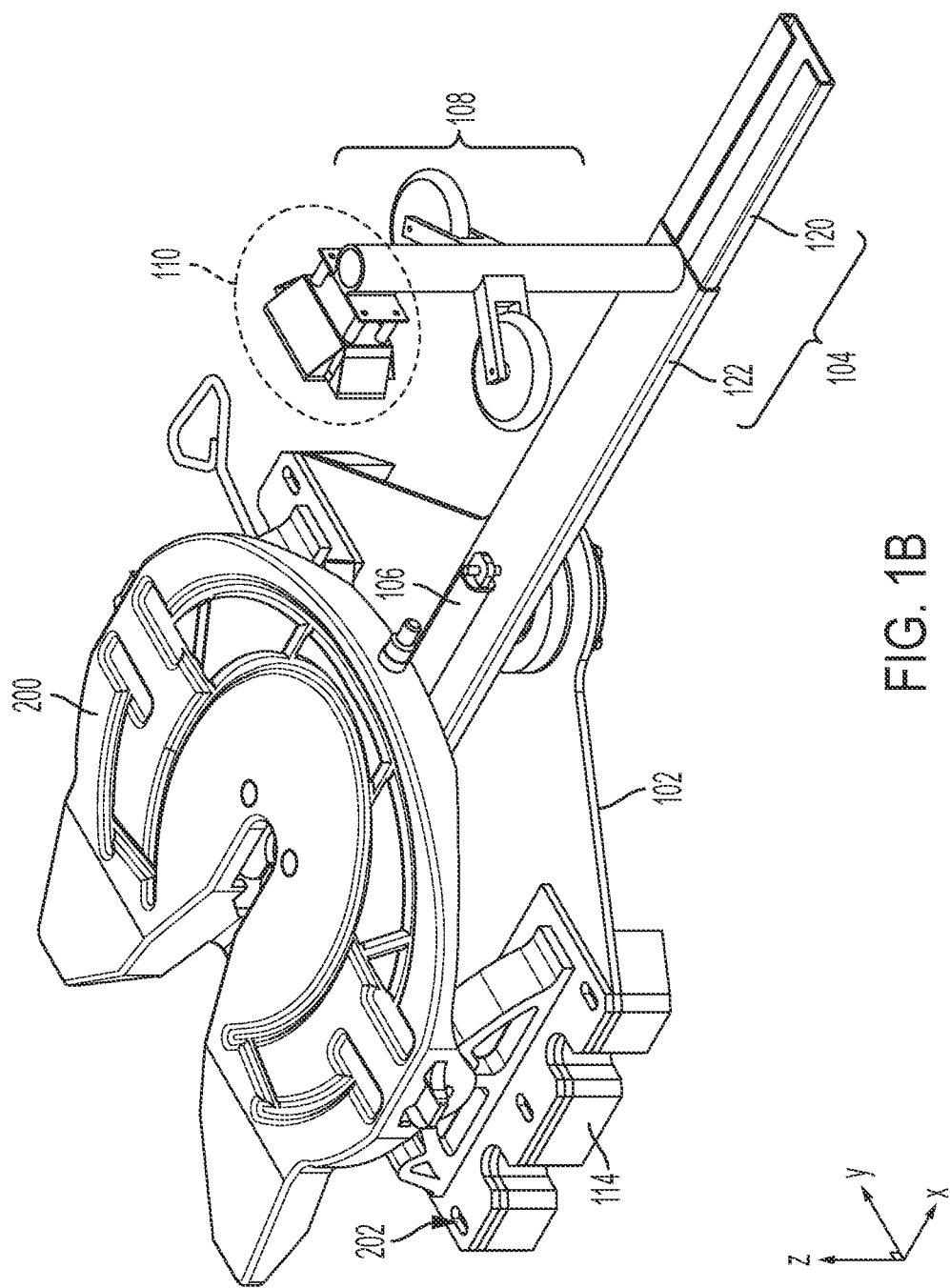
FIG. 1B illustrates a perspective view of the auto-coupling system mounted under a fifth wheel of a towing vehicle, according to some example embodiments of the present disclosure.
Figure 1C:
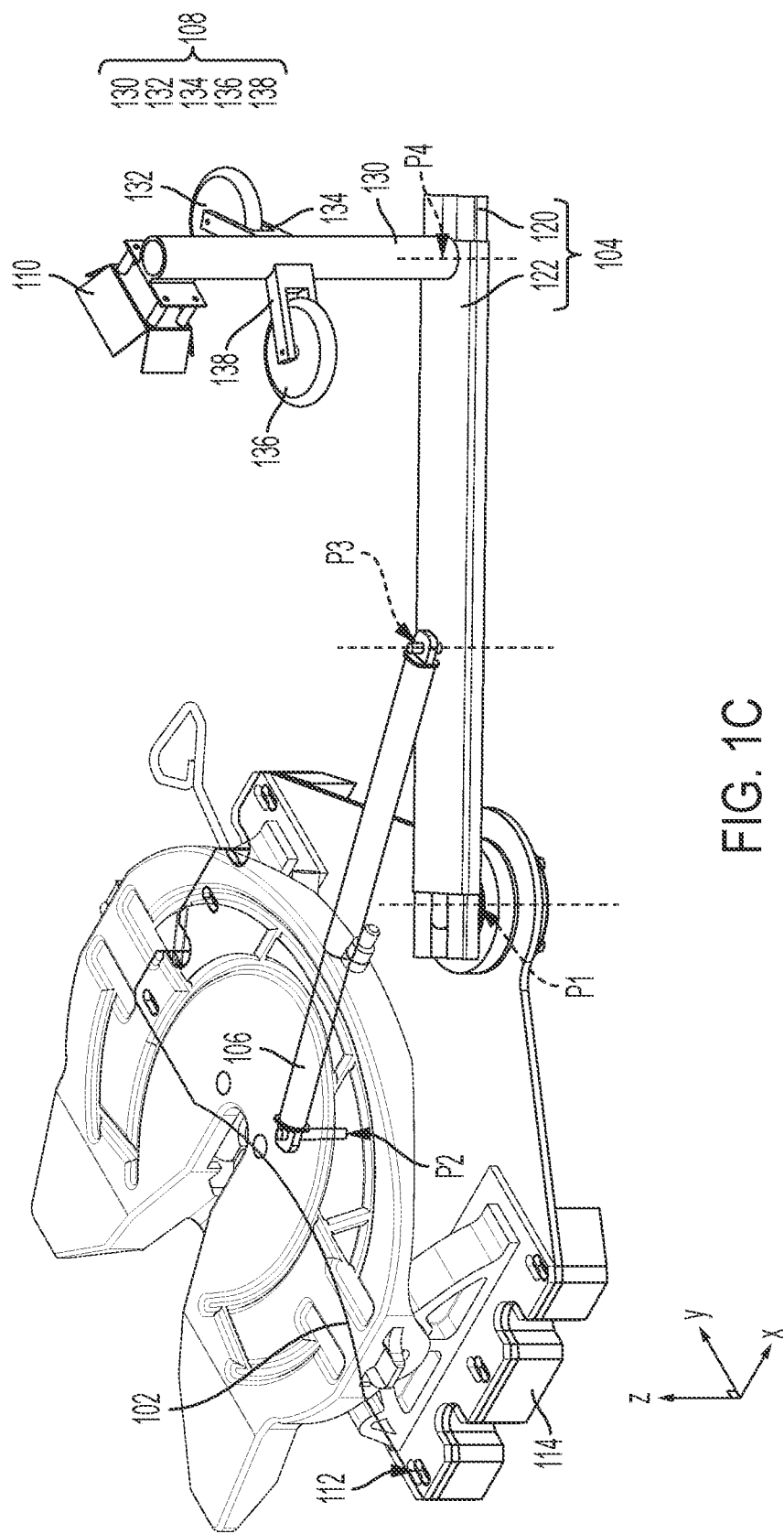
FIG. 1C illustrates a perspective view of the auto-coupling system at a partially extended state, according to some example embodiments of the present disclosure.

FIG. 1A illustrates a perspective view of the auto-coupling system 100 at rest (e.g., in an unextended state), according to some example embodiments of the present disclosure. FIG. 1B illustrates a perspective view of the auto-coupling system 100 mounted under a fifth wheel 200 of a towing vehicle, according to some example embodiments of the present disclosure. FIG. 1C illustrates a perspective view of the auto-coupling system 100 in a partially extended state, according to some example embodiments of the present disclosure.

According to some embodiments, the auto-coupling system 100 includes a base plate 102, an extendable arm 104, a spring 106, an alignment assembly (e.g., a wheel alignment assembly) 108, and a first connector assembly 110.

Referring to FIGS. 1A-1C, the base plate 102 is configured to be mounted to a vehicle frame under a fifth wheel 200 of the towing vehicle. In some examples, the base plate 102 has a plurality of openings (e.g., through-holes), that correspond in position to the mounting/fastening holes 202 of the fifth wheel 200 and allow the base plate 102 to be fixedly mounted between the vehicle frame and fifth wheel 200 via the same securing mechanisms (e.g., bolts/screws) used to mount the fifth wheel 200 to the vehicle. This allows for easy installation of auto-coupling system 100, as installation involves removing the fifth wheel 200, positioning the base plate 102 onto the vehicle frame, and reinstalling the fifth wheel. In some examples, risers 114 may be positions between the vehicle frame and the base plate 102 to create an offset/separation between the bottom of the base plate 102 and the vehicle frame.

Referring to FIGS. 1A-1B, in some embodiments, the extendable arm 104 is rotatably coupled to the base plate 102 at a first point (e.g., first pivot point) P1, and is configured to pivot about a transverse axis (e.g., the Z-axis) that is substantially orthogonal to the top surface of the base plate 102. The first point P1 may be near a tip of a tapered portion 116 of the base plate and thus may be offset (e.g., along the X-axis) from the center of the base plate. The first point P1 extends past a rear side of the fifth wheel 200 of the towing vehicle in a plan view (e.g., the first point P1 is not overlapped by the fifth wheel 200 in the plan view).

The extendable arm 104 is configured to extend in response to the relative movement of the towing vehicle and trailer. In some examples, the extendable arm 104 may extend from about 70 cm to about 120 cm to account for different kingpin positions relative to the front of the trailer and the wide range of angular orientations between the towing vehicle and the trailer.

In some embodiments, the extendable arm 104 includes a first extension member 120 rotatably coupled to the base plate 102 at the first point P1, and a second extension member 122 configured to move (e.g., slide) along a lengthwise direction of the extendable arm 104 relative to the first extension member 120. In some examples, the first extension member 120 may be supported by a double-tapered roller bearing assembly at the first point P1, which allows for greasing to service the bearings. According to some examples, one of the first and second extension members 120 and 122 (e.g., the first extension member 120) includes a guide rail 121 and the other of the first and second extension members 120 and 122 (e.g., the second extension member 122) includes a carriage 123 having one or more carriage rollers that are configured to fit within, and glide against, a track of the guide rail 121.

According to some embodiments, the spring (e.g., a coil spring) 106 is fixedly coupled to the base plate 102 at a second point P2 and is coupled to the second extension member 122 of the extendable arm 104 at a third point P3. Thus, the spring 106 can exert a retractive force onto the extendable arm 104, which can bring the extendable arm 104 back from an extended state to a rest state (e.g., an unextended state). In some embodiments, the second point P2 corresponds to the location of the kingpin (e.g., is vertically under and at the planar (X-Y) location of the kingpin) when the kingpin is engaged by and locked within the fifth wheel 200. In some examples, the spring 106 is covered by a sleeve to protect it from the elements.

The alignment assembly (e.g., wheel alignment assembly) 108 couples the first connector assembly 110 to the extendable arm 104. In some embodiments, the alignment assembly 108 is rotatably coupled to the extendable arm 104 and is configured to move against an outer perimeter of the trailer. While the trailer exerts an extensive force on the extendable arm 104 via the alignment assembly 108, this force is counteracted by the refractive force of the spring 106 and as a result the alignment assembly 108 remains pressed against the perimeter of the trailer. The alignment assembly 108 is configured to freely roll along a front surface of the trailer (e.g., along a bump stop at the trailer front) and to come to rest at a point where the spring 106 assumes a shortest length (and lowest tension) according to an orientation between the trailer and the towing vehicle.

In some embodiments, the alignment assembly 108 includes a support arm 130 that extends in a direction that is transverse to a lengthwise direction of the extendable arm (e.g., extends along the Z-axis) and is rotatably coupled to the second extendable member 122 at a fourth point P4 that is nearly farthest away from the first point P1. In some examples, the alignment assembly 108 further includes a first wheel 132 coupled to the support arm 130 via a first frame (e.g., a U-shaped roller mounting frame) 134, and a second wheel 136 coupled to the support arm 130 via a second frame 138. The second frame 138 may be at an angle with respect to the first frame 134. Each of the first and second wheels 132 and 136 may be rotatably mounted to the respective first or second frame 134 and 138 via a wheel axle. While FIGS. 1A-1B illustrate the use of a pair of wheels, embodiments of the present disclosure are not limited thereto, and any suitable number of wheels, skids, rollers or other locating apparatus, may be utilized to allow the alignment assembly 108 to roll or slide across the front surface of the trailer (e.g., ride long a bump stop at the trailer front).

Regardless of the distance between the kingpin and the front of the trailer, which may be variable across different trailers, the wheels 132 and 136 allow the first connector assembly 110 to position itself at the centerline of the trailer because that is the position where the spring length is the smallest (and hence the spring 106 is at rest). The positioning occurs whist the towing vehicle is backing into the trailer during a coupling maneuver. As the trailer may have a second connector assembly mounted to the nose of trailer at its centerline, the alignment assembly 108 guides the first connector assembly 110 to the trailer's second connector assembly to facilitate the alignment of the two assemblies. Further, the ability of the alignment assembly 108 to freely pivot at the fourth point P4 ensures orthogonal alignment with the receiving second connector assembly on the trailer.

FIG. 2A illustrates a top view of the first and second connector assemblies 110 and 210 while they are separated from one another in an unengaged state, according to some example embodiments of the present disclosure. FIG. 2B illustrates a top view of the first and second connector assemblies 110 and 210 in an engaged state, according to some example embodiments of the present disclosure.

Referring to FIGS. 2A-2B, the first connector assembly may have a tapered enclosure 140 that is fixedly coupled to one or more first electrical conduits 142 and one or more first pneumatic conduits 144 stemming from the tractor. The second connector assembly 210, which may be mounted to the front surface of the trailer, may have a corresponding tapered enclosure 212 that allows it to mate with the first connector assembly 110. The second connector assembly 210 is fixedly coupled to one or more second electrical conduits 214 and one or more second pneumatic conduits 216 that are connected to the trailer. In some examples, the connector assemblies may be about 10 cm to about 20 cm wide, and about 6 cm to about 10 cm high.

Once the assemblies are properly mated, the electrical conduits 142 and 214 as well as the pneumatic conduits 144 and 216 may be securely connected to enable the supply of electrical power and air to the trailer and the communication of electronic signals between the towing vehicle and trailer.

While FIGS. 2A-2B provide particular examples of the connector assemblies 110 and 210, embodiments of the present disclosure are not limited thereto, and the auto-coupling system 100 can work with any suitable connector assembly and provide adequate alignment during coupling maneuvers. Further, while only electrical and pneumatic connections have been shown, embodiments of the present disclosure are not limited thereto, and any other suitable connection may be established by the assemblies 110 and 210.

Figure 3A:
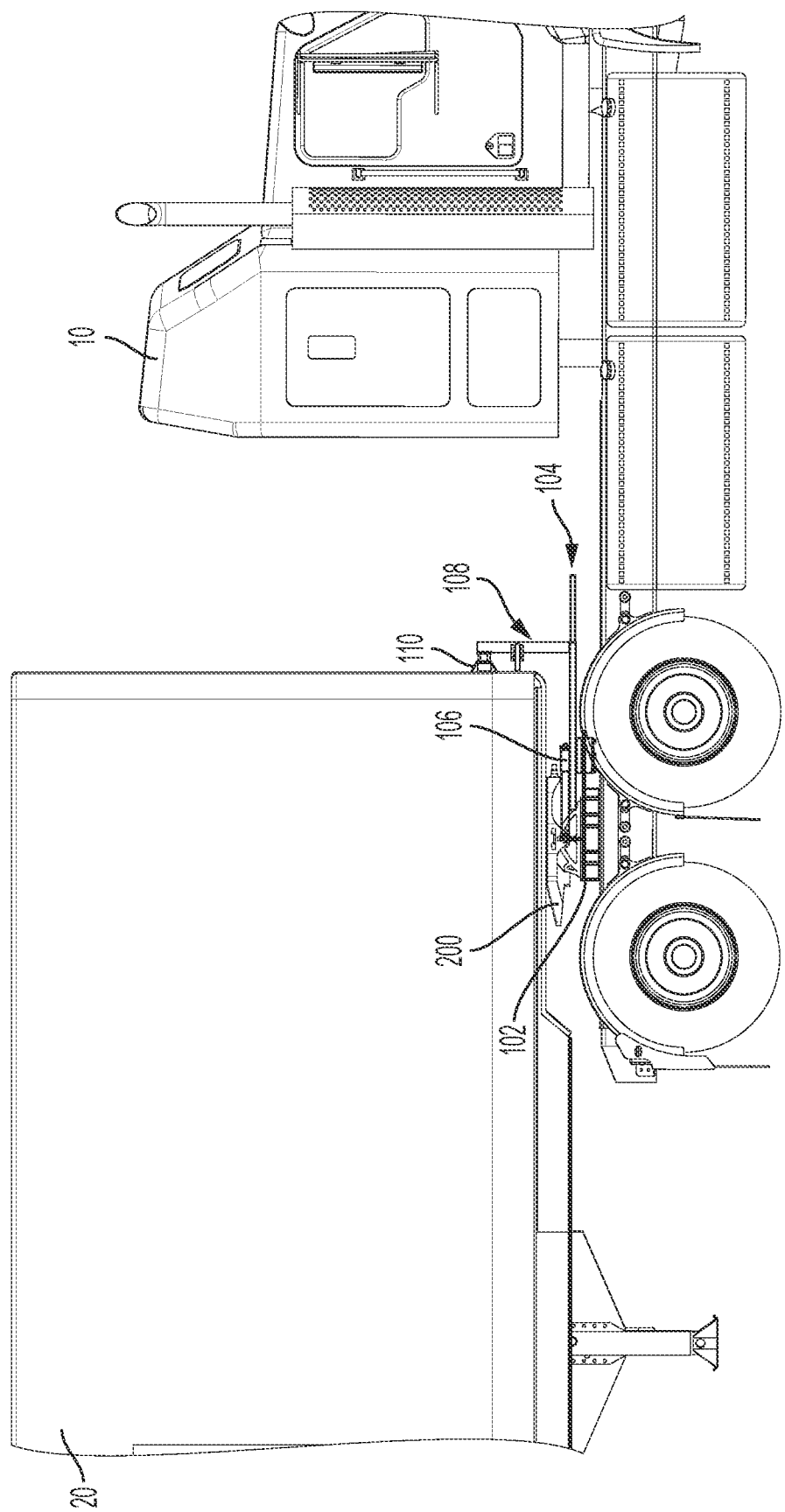
FIGS. 3A-3C illustrates a side view and perspective views of the towing vehicle and trailer in a coupled state, according to some example embodiments of the present disclosure.
Figure 3B:
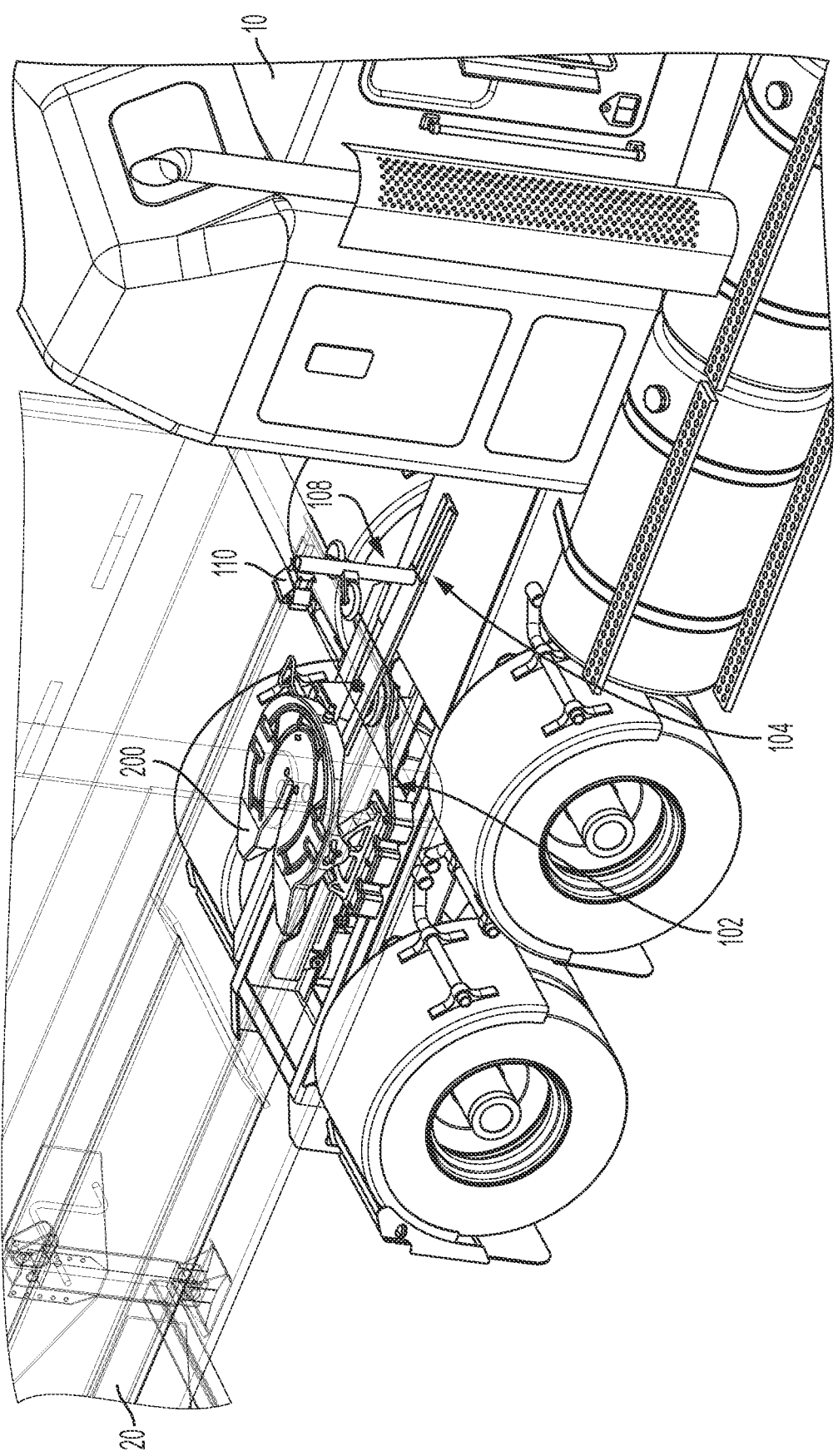
Figure 3C:
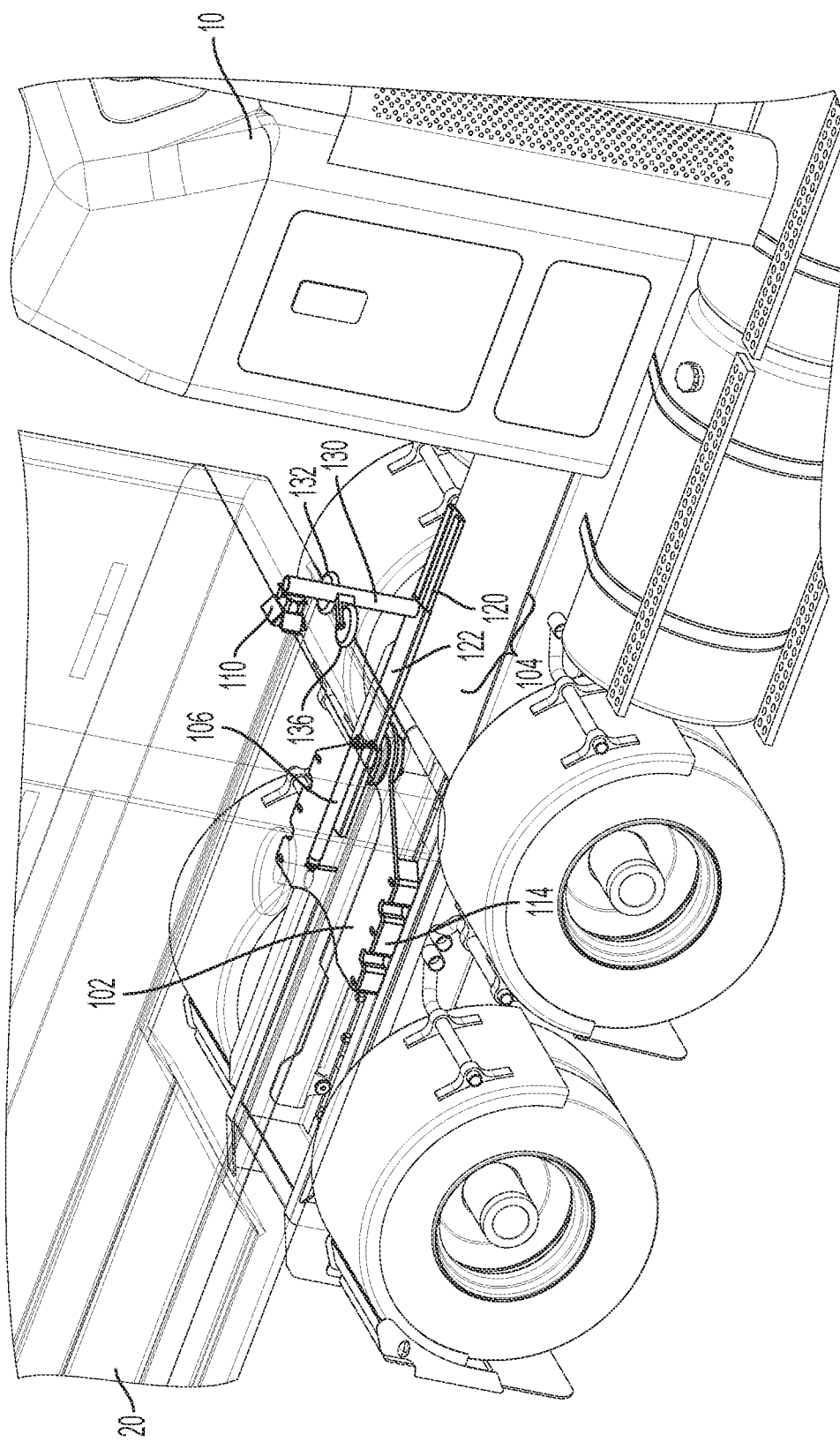

FIGS. 3A-3C illustrates a side view and perspective views of the towing vehicle 10 and trailer 20 in a coupled state, according to some example embodiments of the present disclosure. In FIG. 3C, the towing vehicle 10 and trailer 20 have been shown in transparent form to more clearly illustrate the auto-coupling system in relation to the towing vehicle 10 and trailer 20.

When a towing vehicle 10 backs into a trailer 20 to engage the kingpin of the trailer 20 with the fifth wheel 200 and to couple the vehicle and trailer together, the auto-coupling system 100 is capable of bringing the first connector assembly 110 in close proximity to, and in alignment with, the second connector assembly 210. According to some examples, the auto-coupling system 100 may bring the connector assemblies 110 and 210 to within about 1 cm to about 5 cm of one another. At that point, actuation/engagement mechanisms equipped with the assemblies 110 and 210 may mate the two assemblies (e.g., by fully seating the second connector assembly 210 within a receptacle of the first connector assembly 110) to establish the electrical, pneumatic, and other connection between the towing vehicle 10 and the trailer 20.

Figure 4A:
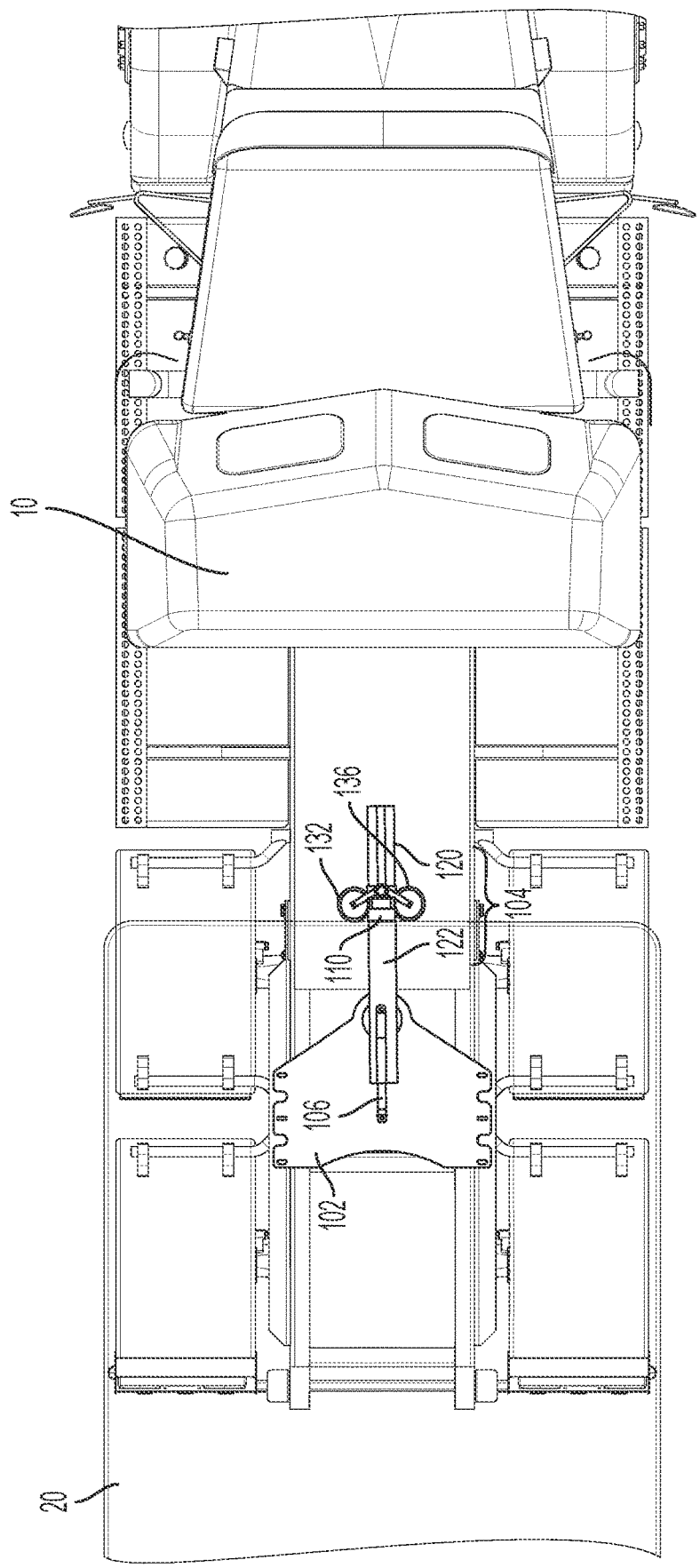
FIGS. 4A-4C respectively illustrate a towing vehicle performing a coupling maneuver at a 0 degree angle and a 45 degree angle relative to the trailer, according to some example embodiments of the present disclosure.
Figure 4B:
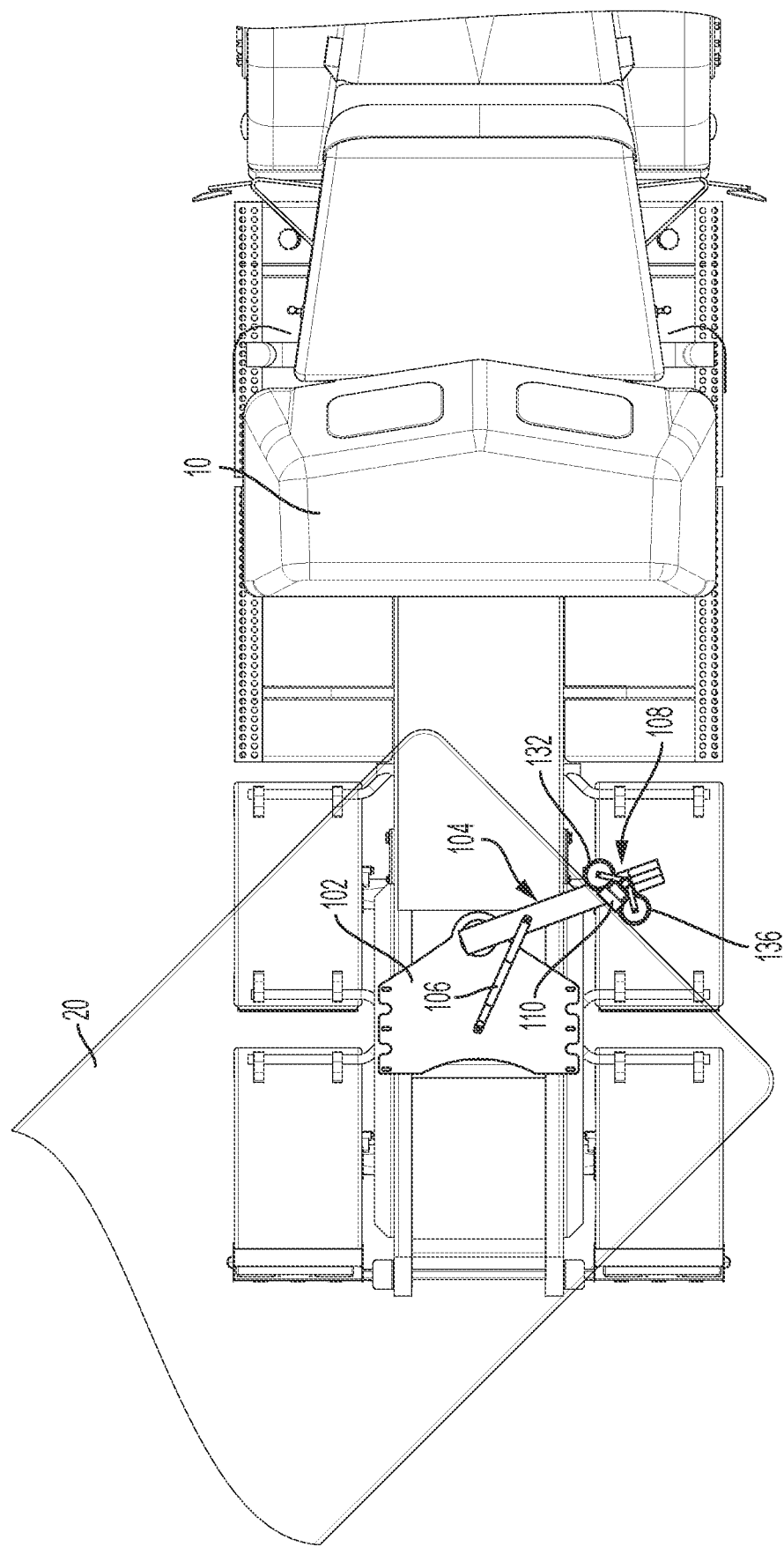
Figure 4C:
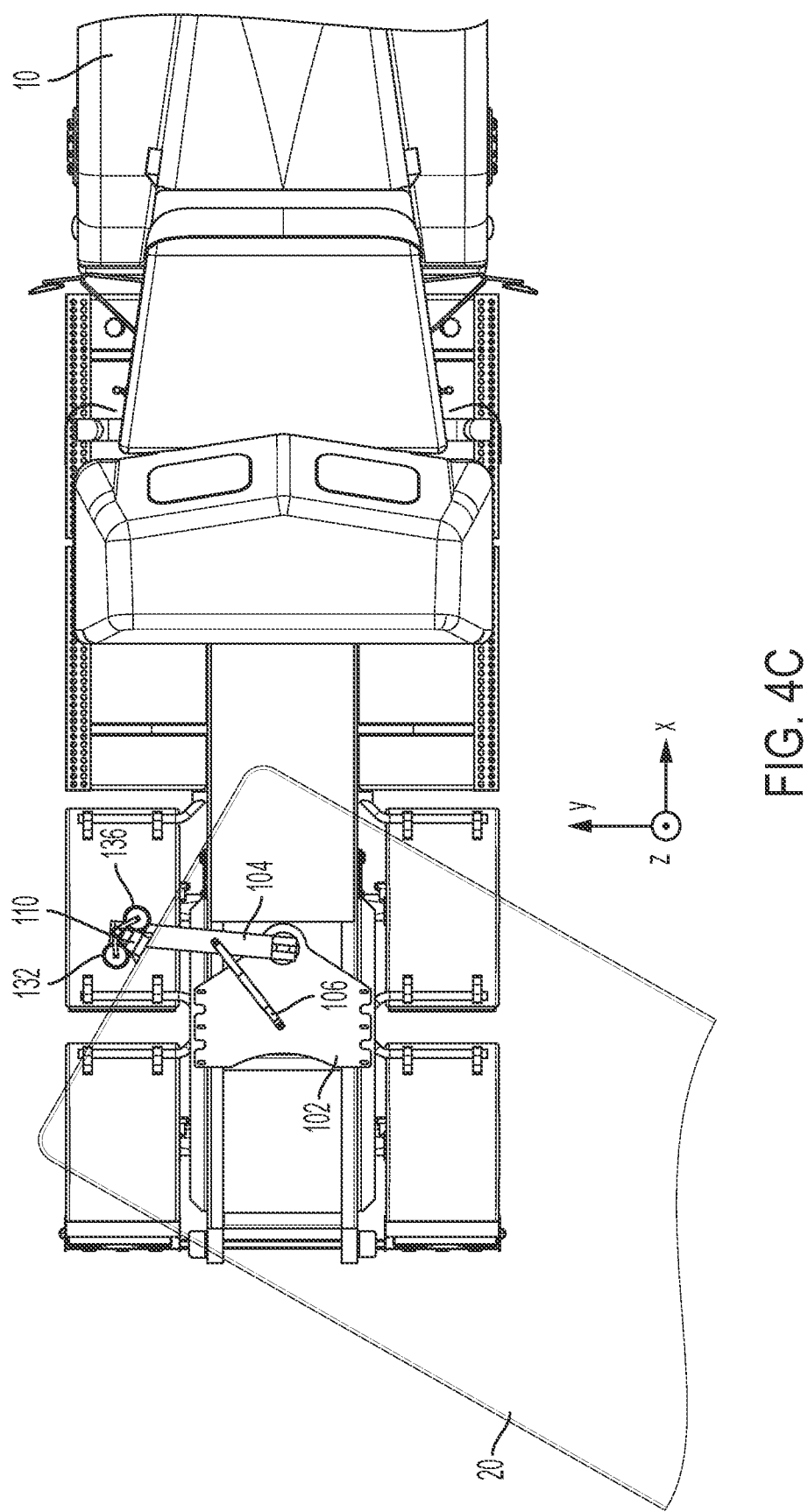

FIGS. 4A-4C respectively illustrate a towing vehicle 10 performing a coupling maneuver at a 0 degree angle and a 45 degree angle relative to the trailer 20, according to some example embodiments of the present disclosure. In FIGS. 4A-4C, the fifth wheel 200 has been hidden from view to more clearly show the orientation of the extendable arm 104 and the alignment assembly 108.

As illustrated in FIGS. 4A-4C, the auto-coupling system 100 is capable of ensuring proper alignment of the connector assemblies 110 and 210 not just when a towing vehicle 10 backs straight into a trailer 20 (FIG. 4A), but also during coupling maneuvers that are executed from a vehicle-trailer angle of approach (also referred to as an engagement angle) of about −45 degrees and about 45 degrees (FIG. 4B-4C). This allows the auto-coupling system 100 to be used in environments, such as ports or rail yards, where trailers may be closely parked back-to-back in order to save space, and where it is common to have to perform a coupling maneuver while at a 45 degree angle relative to the trailer 20.

Figure 5A:
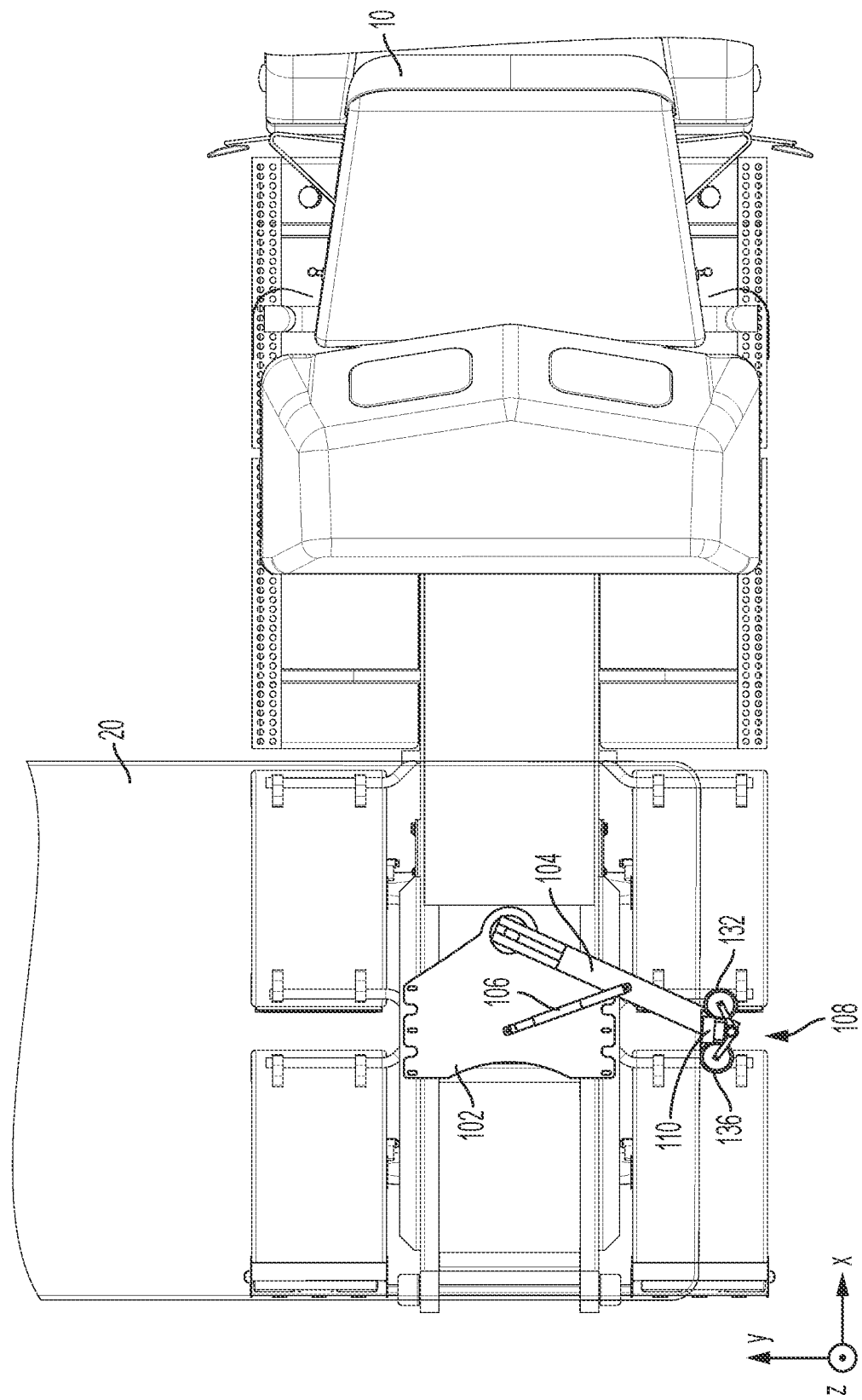
FIGS. 5A-5B illustrate the auto-coupling system maintaining alignment of connector assemblies despite a right-angle orientation between the towing vehicle and trailer, according to some example embodiments of the present disclosure.
Figure 5B:
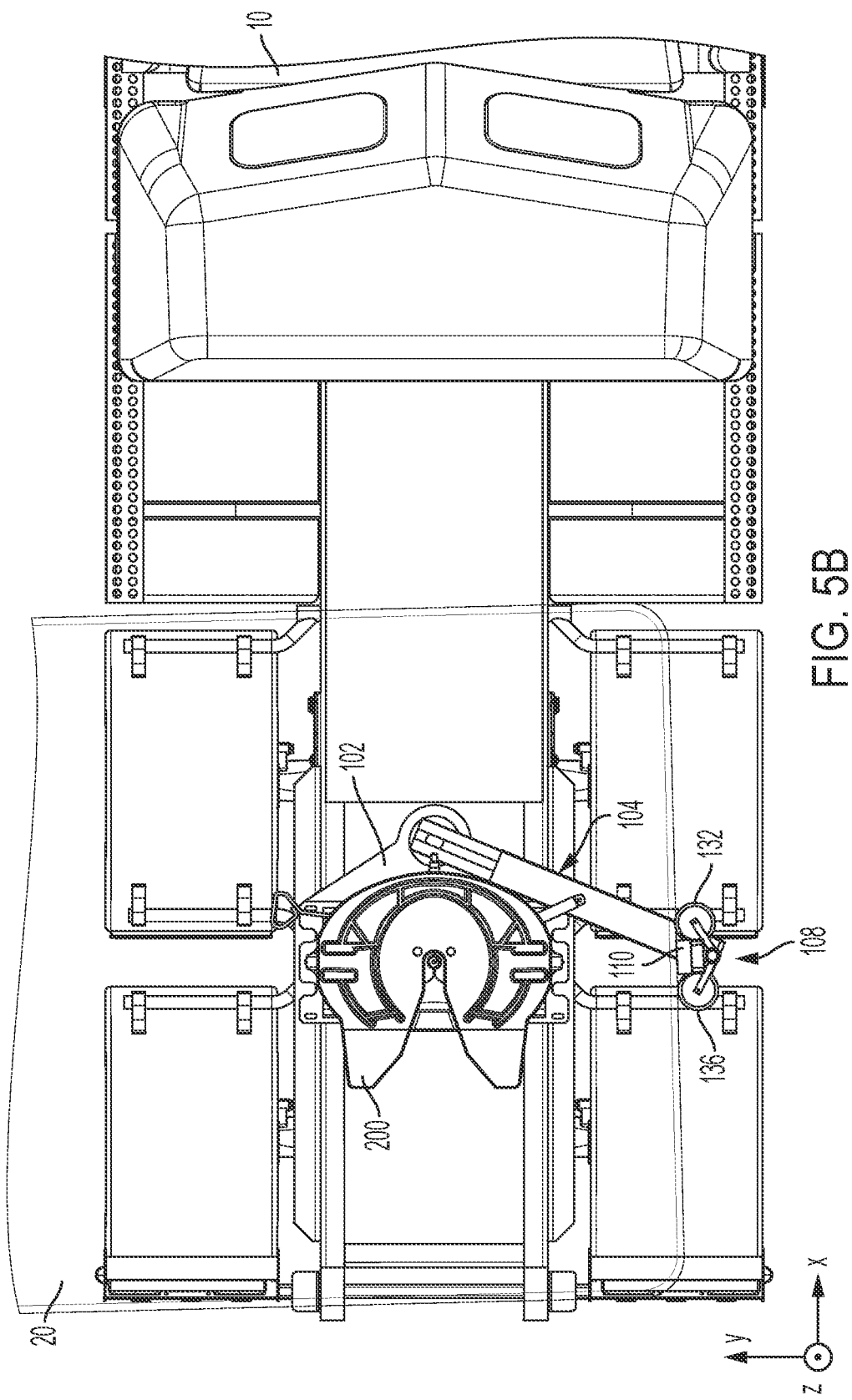

FIGS. 5A-5B illustrate the auto-coupling system 100 maintaining alignment of connector assemblies despite a right-angle orientation between the towing vehicle 10 and trailer 20, according to some example embodiments of the present disclosure. In FIG. 5A, the fifth wheel 200 has been hidden from view to more clearly show the orientation of the extendable arm 104 and the alignment assembly 108 relative to the base plate 102.

Referring to FIGS. 5A-5B, once alignment and connection seating has been achieved, the auto-coupling system 100 maintains the connection between the connector assemblies 110 and 210 during driving, even around sharp turns. In some embodiments, the auto-coupling system 100 is capable of articulating +/−135 degrees to accommodate for a fully jack-knifed trailer 20 without damage to the auto-coupling system 100, the fifth wheel, or any other constituent components of the towing vehicle 10 and trailer 20, while maintaining a secure connection between the connector assemblies 110 and 210 of the towing vehicle 10 and trailer 20. The angle of articulation may be the angle between an extension direction of the extendable arm 104 and the longitudinal direction of the towing vehicle 10 (i.e., along the X-axis).

The ability of the auto-coupling system 100 to accommodate such wide turning angles stems from the appropriate selection of the relative location of the pivot points, i.e., the first to fourth points P1-P4. For example, if the third point P3 at which the spring 106 is coupled to the extendable arm 104 is off in any direction, then either the connector assemblies 110 and 210 may not line up, or the extendable arm 104 may collide with the fifth wheel 200 in a tight turn. Further, had the pivot point P1 of the extendable arm 104 been at the center of base plate 102 (e.g., if the first and second points P1 and P2 were merged or were close to each other), this would severely limit the range of the auto-coupling system as a turn of, for example, more than 45 degree could break the connection between the connector assemblies 110 and 210. Having this pivot point P1 out and away from the center of the base plate 102 (i.e., separating the first and second points P1 and P2) and utilizing the spring 106 allows for maintaining alignment even in very tight turns (e.g., when the towing vehicle 10 and trailer 20 are jack-knifed).

Figure 6A:
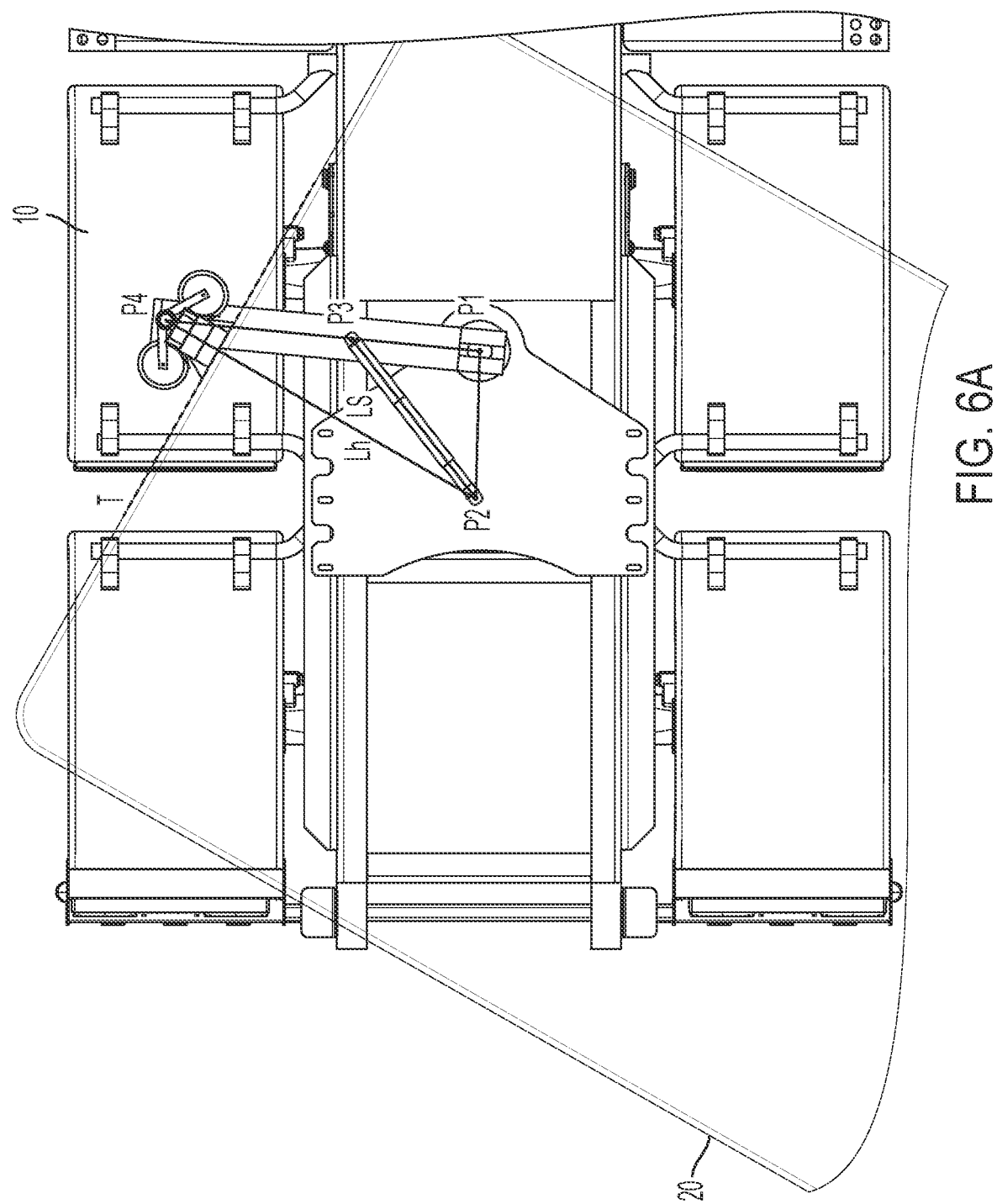
FIGS. 6A-6B illustrate the spatial relationship of the first to fourth pivot points of the auto-coupling system, according to some example embodiments of the present disclosure.
Figure 6B:
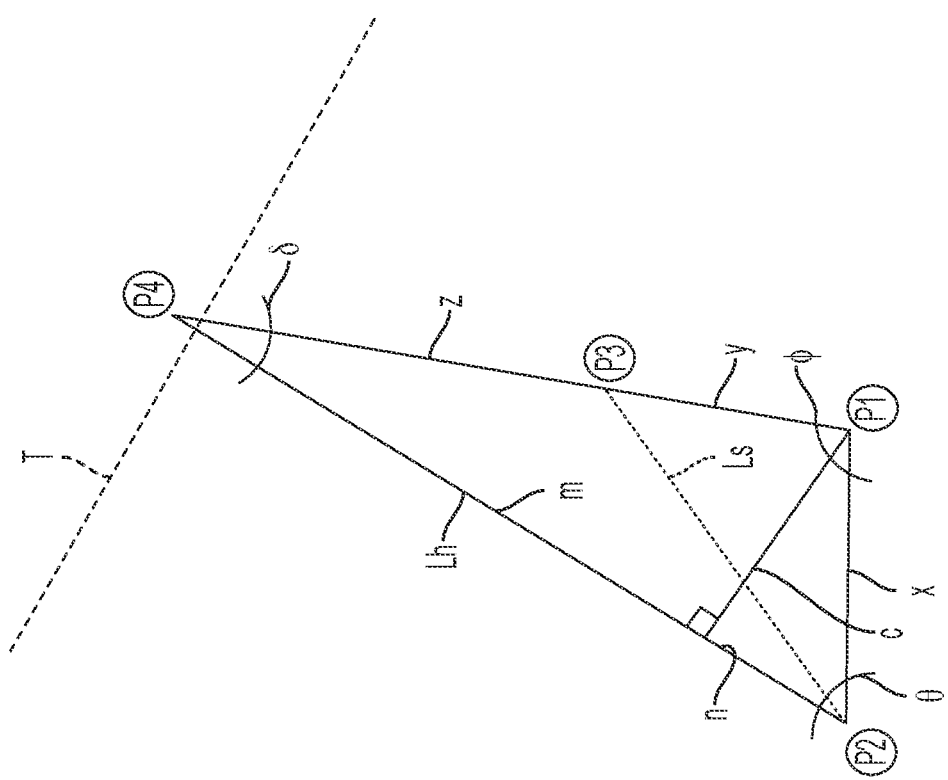

FIGS. 6A-6B illustrate the spatial relationship of the first to fourth points P1-P4, according to some example embodiments of the present disclosure.

In FIGS. 6A-6B, vector Lh, which is imaginary line connecting the second and fourth points P2 and P4, and the vector T that represents the front face of the trailer 20 are orthogonal to one another and intersect at the center of the vector T (i.e., the center of the trailer nose). Vector x represents the distance between the first and second points P1 and P2, vector y represents the distance between the first and third points P1 and P3, vector z represents the distance between the third and fourth points P3 and P4, and vector Ls represents the length of the spring 106. Vector Lh represents the distance between the kingpin to the center of the front surface of the trailer 10.

Vectors y, and Ls have variable lengths that depend on the relative orientation of the towing vehicle 10 and the trailer 20, but the vectors x and z have a constant length, and the vector Lh has a constant length for a given trailer 10. In some examples, the length of x may be about 43 cm to about 51 cm, the length of z may be about 45 cm to about 65 cm, and the length of Lh may be between about 0.9 m to about 1.2 m, depending on the trailer. The angle θ represents the relative angle of the towing vehicle 10 and trailer 20 which may be range from about −135 degrees to about 135 degrees.

Given length Lh and angle θ and assuming x and z are constant, the spring length Ls can be derived as follows:

$$m = Lh - n \qquad \text{Eq. (1)}$$
$$n = x\cos(\theta)$$
$$m = Lh - x\cos(\theta)$$
$$c = x\sin(\theta)$$
$$(y + z)^2 = m^2 + c^2$$
$$y = \sqrt{(Lh - x\cos(\theta))^2 + (x\sin(\theta))^2} - z$$
$$\varphi = 180 - \theta - \delta \qquad \text{Eq. (2)}$$
$$\varphi = 180 - \theta - \tan^{-1}\left(\frac{x\sin(\theta)}{Lh - x\cos(\theta)}\right)$$
$$Ls = \sqrt{y^2 + x^2 - 2xy\cos(\varphi)} \qquad \text{Eq. (3)}$$

Thus, using Equations 1, 2, and 3, the length Ls of the spring 106 may be determined given an angle θ and lengths x, z, and Lh. From these equations, it may be shown that whenever P4 is located at any position along T other than the intersection of Lh and T (where φ changes to φ+Δφ) then Ls will increase. That is to say that, at all lengths of Lh (between about 0.9 m to about 1.2 m) and all angles of θ between −45 degrees and 45 degrees, the vector Ls is at its shortest possible length when T and Lh are orthogonal at T's center point. In other words, as the spring tries to shorten its length given a vehicle-trailer orientation, the spring 106 brings/directs the alignment assembly 108 toward the center of the front face of the trailer 10.

Thus, as provided above, the auto-coupling system 100 according to some embodiments, uses passive (i.e., non-active) mechanical means with few components to align, and maintain the connection between, the connector assemblies of the trailer and towing vehicle. Not using any electronics or pneumatic actuators to achieve this alignment, reduces overall system complexity, cost, and possibility for breakdown and malfunction. The auto-coupling system has a simple and quick installation process that involves only a few steps for mounting the base plate 102 between the vehicle frame and the fifth wheel, and may not involve any modifications to the trailer. Thus, the auto-coupling system 100 may work with an existing fifth wheel of a towing vehicle and is compatible with most trailers.

Because the auto-coupling system 100 does not involve any changes to the underside of a trailer and its kingpin or kingpin plate, the system is also rail-compliant. This is in contrast to other solutions in which mechanisms are added to the trailer, which can make them incompatible with the reverse fifth wheel of rail cars and thus prevent them from being loaded onto a rail car.

According to some embodiments, the auto-coupling system 100 allows for proper alignment of the connector assemblies even when the towing vehicle approaches a trailer at an angle (e.g., a 45 degree angle), and is capable of maintaining alignment even around very tight turns and acute trailer-vehicle angles (e.g., at a 135 degree bend) in either direction. This is particularly desirable in autonomous tractors and will allow such tractors to back into a trailer and automatically connect the electrical, pneumatic, and other connections without the need for any human intervention.

The present invention is not to be limited in scope by the specific embodiments described herein. Indeed, other various embodiments of and modifications to the present invention, in addition to those described herein, may be apparent to those of ordinary skill in the art from the foregoing description and accompanying drawings. Thus, such other embodiments and modifications are intended to fall within the scope of the present invention. Further, although the present invention has been described herein in the context of a particular implementation in a particular environment for a particular purpose, those of ordinary skill in the art may recognize that its usefulness is not limited thereto and that the present invention may be beneficially implemented in any number of environments for any number of purposes. Accordingly, the claims set forth below should be construed in view of the full breadth and spirit of the present invention as described herein and equivalents thereof.

It should be understood that embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and equivalents thereof.

What is claimed is:

1. An auto-coupling system for coupling a trailer and a towing vehicle, the auto-coupling system comprising:
    a base plate between a vehicle frame and a fifth wheel of the towing vehicle;
    an extendable arm rotatably coupled to the base plate at a first point and configured to extend in response to relative movement of the towing vehicle and the trailer;
    a spring fixedly coupled to the base plate at a second point and coupled to the extendable arm, the spring being configured to exert a retractive force onto the extendable arm, the second point being at a fixed point on the base plate and being offset at a fixed distance from the first point; and
    an alignment assembly rotatably coupled to the extendable arm and configured to move against an outer perimeter of the trailer.

2. The auto-coupling system of claim 1, wherein the first point is offset from the second point along a longitudinal direction of the towing vehicle, and
    wherein the first point extends past the fifth wheel of the towing vehicle in a plan view.

3. The auto-coupling system of claim 1, wherein the base plate has a plurality of openings corresponding in position to mounting holes of the fifth wheel.

4. The auto-coupling system of claim 1, further comprising:
    a riser between the base plate and the vehicle frame and configured to offset a bottom surface of the base plate from a top of the vehicle frame.

5. The auto-coupling system of claim 1, wherein the trailer exerts an extensive force on the extendable arm via the alignment assembly as the alignment assembly is pressed against a perimeter of the trailer, and
    wherein the extensive force counteracts the retractive force.

6. The auto-coupling system of claim 1, wherein the extendable arm is pivotally coupled to the base plate by a roller bearing.

7. The auto-coupling system of claim 1, wherein the extendable arm is configured to align the alignment assembly with a centerline of the trailer for an engagement angle of −45 degrees to 45 degrees.

8. The auto-coupling system of claim 1, wherein the extendable arm comprises:
    a first extension member rotatably coupled to the base plate; and
    a second extension member configured to slide along a lengthwise direction of the extendable arm relative to the first extension member.

9. The auto-coupling system of claim 8, wherein one of the first and second extension members comprises a guide rail, and
    wherein another one of the first and second extension members comprises a carriage having one or more carriage rollers that are configured to fit within and glide against a track of the guide rail.

10. The auto-coupling system of claim 8, wherein the spring is fixedly coupled to the second extension member of the extendable arm at a third point.

11. An auto-coupling system for coupling a trailer and a towing vehicle, the auto-coupling system comprising:
    a base plate between a vehicle frame and a fifth wheel of the towing vehicle;

an extendable arm rotatably coupled to the base plate at a first point and configured to extend in response to relative movement of the towing vehicle and the trailer:

a spring fixedly coupled to the base plate at a second point and coupled to the extendable arm, the spring being configured to exert a retractive force onto the extendable arm; and an alignment assembly rotatably coupled to the extendable arm and configured to move against an outer perimeter of the trailer, wherein the alignment assembly is configured to freely roll along a front surface of the trailer and to come to rest at a point where the spring assumes a shortest length according to an angular orientation between the trailer and the towing vehicle.

12. An auto-coupling system for coupling a trailer and a towing vehicle, the auto-coupling system comprising:

a base plate between a vehicle frame and a fifth wheel of the towing vehicle;

an extendable arm rotatably coupled to the base plate at a first point and configured to extend in response to relative movement of the towing vehicle and the trailer:

a spring fixedly coupled to the base plate at a second point and coupled to the extendable arm, the spring being configured to exert a retractive force onto the extendable arm; and an alignment assembly rotatably coupled to the extendable arm and configured to move against an outer perimeter of the trailer, wherein the alignment assembly comprises:

a support arm extending transverse to a lengthwise direction of the extendable arm and rotatably coupled to a contact arm of the extendable arm at a third point;

a first wheel coupled to the support arm via a first frame; and a second wheel coupled to the support arm via a second frame, the second frame being at an angle with respect to the first frame.

13. The auto-coupling system of claim 12, wherein the first and second wheels are configured to move across a front surface of the trailer facing the towing vehicle.

14. The auto-coupling system of claim 1, further comprising:

a first connector assembly coupled to the alignment assembly and configured to mate with a second connector assembly of the trailer in response to the towing vehicle performing a coupling maneuver with the trailer.

15. The auto-coupling system of claim 14, wherein the first connector assembly is connected to first electrical and pneumatic conduits from the towing vehicle, and the second connector assembly is connected to second electrical and pneumatic conduits to the trailer.

16. The auto-coupling system of claim 14, wherein the extendable arm, the spring, and the alignment assembly are together configured to align the first connector assembly with the second connector assembly.

17. The auto-coupling system of claim 14, wherein the extendable arm, the spring, and the alignment assembly are together configured to position the first connector assembly to within 1 cm to 5 cm of the second connector assembly.

18. The auto-coupling system of claim 14, wherein the extendable arm, the spring, and the alignment assembly are together configured to maintain alignment between the first and second connector assemblies through trailer-vehicle angles of −135 degrees to 135 degrees.

* * * * *

UNITED STATES PATENT AND TRADEMARK OFFICE
CERTIFICATE OF CORRECTION

| | |
|---|---|
| PATENT NO. | : 11,738,812 B2 |
| APPLICATION NO. | : 17/374699 |
| DATED | : August 29, 2023 |
| INVENTOR(S) | : Daniel William Forthoffer |

It is certified that error appears in the above-identified patent and that said Letters Patent is hereby corrected as shown below:

On the Title Page

Item (56), in Column 2, under "Other Publications", Line 1, delete "KKK" and insert -- KKS --.

In the Claims

In Column 11, Line 3, in Claim 11, delete "trailer:" and insert -- trailer; --.

In Column 11, Line 22, in Claim 12, delete "trailer:" and insert -- trailer; --.

Signed and Sealed this
Twenty-eighth Day of November, 2023

Katherine Kelly Vidal
*Director of the United States Patent and Trademark Office*